United States Patent
Kalmanek, Jr. et al.

(10) Patent No.: US 7,808,968 B1
(45) Date of Patent: Oct. 5, 2010

(54) METHOD FOR DETERMINING NON-BROADCAST MULTIPLE ACCESS (NBMA) CONNECTIVITY FOR ROUTERS HAVING MULTIPLE LOCAL NBMA INTERFACES

(75) Inventors: Charles Robert Kalmanek, Jr., Short Hills, NJ (US); Anthony G Lauck, Warren, VT (US); Kadangode K. Ramakrishnan, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1026 days.

(21) Appl. No.: 10/767,520

(22) Filed: Jan. 29, 2004

Related U.S. Application Data

(63) Continuation of application No. 09/345,121, filed on Jul. 6, 1999, now Pat. No. 6,711,152.

(60) Provisional application No. 60/091,846, filed on Jul. 6, 1998.

(51) Int. Cl.
*H04L 12/28* (2006.01)

(52) U.S. Cl. .................... 370/351; 370/389

(58) Field of Classification Search ............ None
See application file for complete search history.

(56) References Cited

U.S. PATENT DOCUMENTS

| | | | | |
|---|---|---|---|---|
| 5,699,347 A * | 12/1997 | Callon | ............ | 370/238 |
| 5,917,820 A * | 6/1999 | Rekhter | ............ | 370/392 |
| 6,055,561 A * | 4/2000 | Feldman et al. | ............ | 709/200 |
| 6,167,052 A * | 12/2000 | McNeill et al. | ............ | 370/399 |
| 6,314,105 B1 * | 11/2001 | Luong | ............ | 370/395.2 |
| 6,330,614 B1 * | 12/2001 | Aggarwal et al. | ............ | 709/236 |
| 6,418,476 B1 * | 7/2002 | Luciani | ............ | 709/238 |
| 6,711,152 B1 * | 3/2004 | Kalmanek et al. | ............ | 370/351 |

* cited by examiner

*Primary Examiner*—Ayaz R Sheikh
*Assistant Examiner*—Blanche Wong

(57) ABSTRACT

The present invention discloses an efficient architecture for routing in a very large autonomous system where many of the layer 3 routers are attached to a common connection-oriented layer 2 subnetwork, such as an ATM network. In a preferred embodiment of the invention, a permanent topology of routers coupled to the subnetwork is connected by permanent virtual circuits. The routers can further take advantage of both intra-area and inter-area shortcuts through the layer 2 network to improve network performance. The routers pre-calculate shortcuts using information from link state packets broadcast by other routers and store the shortcuts to a given destination in a forwarding table, along with corresponding entries for a next hop along the permanent topology. The present invention allows the network to continue to operate correctly if layer 2 resource limitations preclude the setup of additional shortcuts.

4 Claims, 12 Drawing Sheets

```
[OSPF ROUTER ID AND OTHER OSPF HEADERS]
NUMBER OF NBMA INTERFACES
    FIRST NBMA INTERFACE ADDRESS, INTERFACE CLASS NUMBER
    SECOND NBMA INTERFACE ADDRESS, INTERFACE CLASS NUMBER
    ...
    FINAL NBMA INTERFACE ADDRESS, INTERFACE CLASS NUMBER
```

FIG. 4

| | |
|---|---|
| NBMA_CONNECTED[ROUTER ID] | A BOOLEAN THAT IS TRUE IF THERE IS NBMA CONNECTIVITY. USED WHEN CALCULATING BEST SHORTCUTS |
| SHORTCUT_COST[ROUTER ID] | A POSITIVE VALUE REPRESENTING THE COST OF TAKING A SHORTCUT. USED WHEN CALCULATING BEST SHORTCUTS |
| INTERFACE[ROUTER ID] | A LOCAL HANDLE ON THE INTERFACE TO BE USED WHEN ESTABLISHING A CONNECTION. USED WHEN ESTABLISHING SHORTCUTS |
| NBMA_ADDRESS[ROUTER ID] | THE NBMA ADDRESS TO BE USED WHEN ESTABLISHING A CONNECTION. USED WHEN ESTABLISHING SHORTCUTS |

FIG. 7
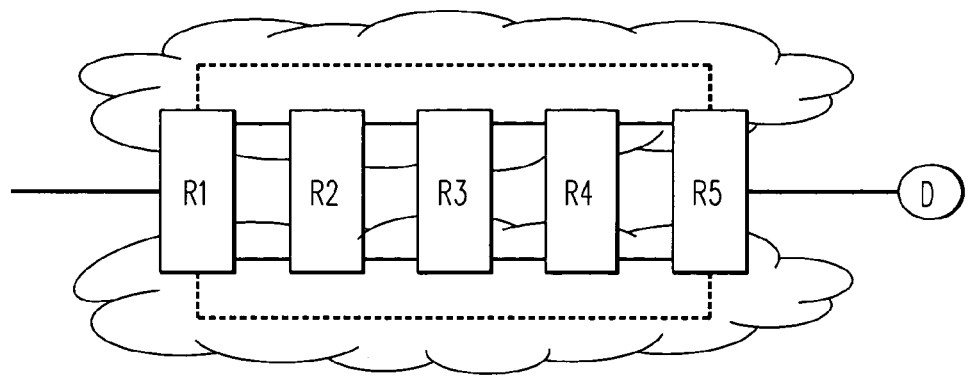
FIG. 7A
R1/7 — R2/9 — R3/2 — R4/1 — R5/1
R1/2 — R2/3 — R3/1 — R4/4 — R5/5
FIG. 8
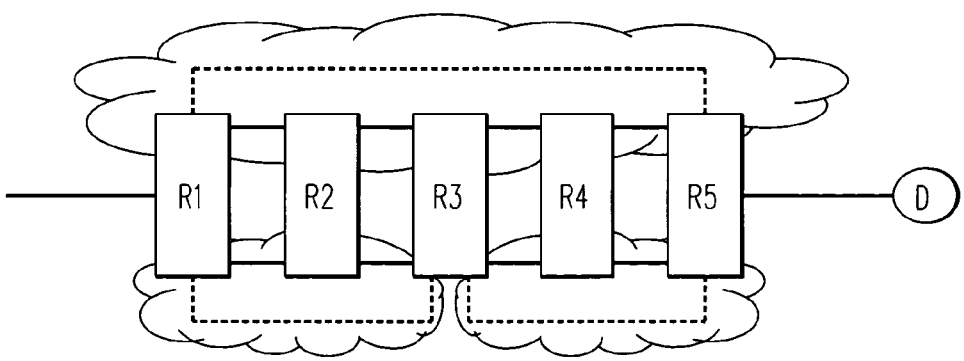
FIG. 8A
R1/1 — R2/1 — R3/1 — R4/1 — R5/1
R1/2 — R2/2 — R3/2 — R3/3 — R4/2 — R5/2

FIG. 13

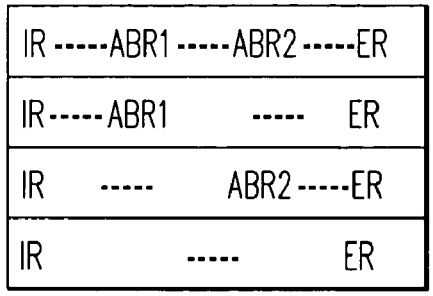

FIG. 14

SUMMARY SHORTCUT LINK STATE ADVERTISEMENT

| |
|---|
| OSPF ROUTER ID OF THE ISSUING ROUTER (e.g. R6 FROM FIG. 12) |
| SET OF REACHABLE IP ADDRESS (e.g. ADDRESS PREFIX AND MASK INCLUDING D AND H) |
| MAXIMUM CONVENTIONAL COST (e.g. COST OF RED PATH R6 →H) |
| OSPF ROUTER ID OF THE SHORTCUT TARGET (e.g. D FROM FIG. 12) |
| EXIT COST FROM THE TARGET ROUTER TO THE DESTINATION ADDRESS (e.g. COST OF PATH D →H) |
| NBMA CONNECTIVITY INFORMATION |

FIG. 16

```
[OSPF ROUTER ID AND OTHER OSPF HEADERS]
NUMBER OF LOCAL INTERFACE CLASSES
    FIRST LOCAL INTERFACE CLASS
        NUMBER OF REMOTE INTERFACE CLASSES
            FIRST REMOTE INTERFACE CLASS
                    (OSPF ID, CONNECTIVITY CLASS NUMBER)

. . .

LAST REMOTE INTERFACE CLASS
                    (OSPF ID, CONNECTIVITY CLASS NUMBER)
    SECOND LOCAL INTERFACE CLASS
        NUMBER OF REMOTE INTERFACE CLASSES
            FIRST REMOTE INTERFACE CLASS
                    (OSPF ID, CONNECTIVITY CLASS NUMBER)

. . .

LAST REMOTE INTERFACE CLASS
                    (OSPF ID, CONNECTIVITY CLASS NUMBER)
    NEXT LOCAL INTERFACE CLASS, etc.
```

METHOD FOR DETERMINING NON-BROADCAST MULTIPLE ACCESS (NBMA) CONNECTIVITY FOR ROUTERS HAVING MULTIPLE LOCAL NBMA INTERFACES

CROSS REFERENCE TO RELATED APPLICATIONS

This application is a continuation of prior application Ser. No. 09/345,121 filed Jul. 6, 1999 now U.S. Pat. No. 6,711, 152, which claims priority to Provisional Application Ser. No. 60/091,846 filed on Jul. 6, 1998, both of which are incorporated herein by reference.

FIELD OF THE INVENTION

This invention relates generally to a method and apparatus for establishing communication over a telecommunications network and, more particularly, to a network comprising fast switches operating at the datalink layer and interconnecting network layer routers.

BACKGROUND OF THE INVENTION

As communication networks grow in both size and scale, the speed at which packets need to be forwarded becomes higher and higher. The traditional approach to achieve higher switching speeds has been to build fast switches that operate at the datalink layer (otherwise known in the art as layer 2 of the seven-layer OSI model). A more recent trend, spurred on by the dramatic growth of the Internet, has been to build faster network layer (layer 3) routers that have more and more forwarding capacity. Despite the tremendous amount of investment today into fabricating higher speed routers, there are several advantages to combining layer 2 switching and layer 3 forwarding. These include the ability to exploit efficient layer 2 switching, the reduction in router capacity requirements, the ability to provision and manage layer 2 and layer 3 capacity separately, and the ability to share resources with other services. The Internet Protocol (IP) utilized by routers emphasizes efficient transport of best-effort flows and support for large-scale networks. The simpler the model for forwarding in IP, the more likely it is to scale in speed and the number of routes. On the other hand, services that require stringent quality-of-service may want to take advantage of a layer 2 infrastructure that has the ability to support per-flow queuing and scheduling mechanisms, as well as packet forwarding capability.

Asynchronous Transfer Mode (ATM) networks, for example, have become the technology of choice for the Internet backbone because of its ability to support various levels of quality/class of service and because of its speed and scalability over distance. ATM is a connection-oriented layer 2 protocol which utilizes fast cell switching to provide data rates that scale from 25 Mbps up to 622 Mbps and greater. ATM switches store state information to manage a virtual circuit between the source and the destination. The use of connection-oriented virtual circuits allows packets to be divided into smaller, fixed length cells, which minimizes the delay in forwarding data and provides high performance operation.

The incentive to operate IP over an ATM backbone, however, has been complicated by various internetworking issues arising between IP and ATM. The simple approach of having all of the routers connected to the ATM cloud peer with each other resulting in $N^2$ adjacencies, does not scale as the size of the routing tables and the routing overhead grow unreasonably large for network sizes of interest. During the past few years, these issues have been addressed by the Internet Engineering Task Force (IETF), ATM Forum, ITU-T and many industry leaders. See, e.g., Cole et al., "IP over ATM: A Framework Document," Internet Draft (draft-ietf-ipatm-framework-doc-08.txt), Feb. 23, 1996. As a result, a variety of approaches have been proposed to employ ATM in an Internet backbone.

In particular, the IETF is currently studying an address resolution protocol known as the Next Hop Resolution Protocol (NHRP). See Katz et al., "NBMA Next Hop Resolution Protocol (NHRP)," Internet Draft (draft-ietf-rolc-nhrp-04.txt), May 1995. This protocol maps IP addresses to the corresponding ATM addresses that are located across subnetwork boundaries so that paths across distinct ATM clouds may be realized. NHRP, however, raises a number of concerns that motivate the present invention. The NHRP address resolution process adds latency to packet forwarding. In addition, the NHRP model employs servers to process NHRP messages and which must maintain state associated with each NHRP reply that it generates. These servers represent a potential bottleneck, as well as raise issues with regard to scaling and reliability. Furthermore, under certain conditions, NHRP can introduce the possibility of stable routing loops when used between two routers.

Other proposals for combining layer 2 switching with layer 3 routing include Ipsilon's IP switching, Toshiba's Cell Switch Routing (CSR), Aggregate Route-based IP switching (ARTS), and the emerging Multi-Protocol Label Switching (MKS). In each of these proposals, every switch participates in IP routing, although each of the proposals use different variations in the way in which switched paths are established and used. A concern with these approaches is that they fail to maintain architectural independence between the layer 2 and layer 3 networks. This coupling between layers is undesirable, particularly in a large provider network where the layer 2 network may be designed for multiple services and is not necessarily optimized to meet the needs of the IP layer. The above approaches also limit deployment flexibility in that, for example, the scope of the layer 2 and layer 3 networks may necessitate hierarchical approaches to routing. Hybrid switches require support for both ATM and MPLS protocols on every switch, which introduces both architectural and management complexity.

SUMMARY OF THE INVENTION

Accordingly, it is an object of the present invention to provide an architecture that combines layer 2 switching with layer 3 forwarding and which scales to large autonomous systems.

It is another object of the present invention to retain architectural independence between the layer 2 switched network and layer 3 connectionless networks in order to allow for independent design and evolution of the networks.

It is another object of the present invention to avoid the overhead typically associated with address resolution, which can introduce latency and exacerbate the problems of out-of-order delivery of packets in the network.

It is another object of the present invention to provide an architecture that ensures connectivity among the routers and allows for the possibility of shortcut setup failure given that virtual circuit connection resources are limited.

It is another object of the present invention to keep the protocol, storage, and computational overhead to a minimum and to build on existing tested routing protocols allowing the present invention to work with existing router hardware.

It is another object of the present invention to provide for incremental deployment and ease of migration.

The present invention achieves these objectives by providing a robust and efficient architecture for routing in a very large autonomous system where many of the layer 3 routers are attached to a common connection-oriented layer 2 sub-network, such as an ATM network. In a preferred embodiment of the invention, a permanent topology of routers coupled to the subnetwork is connected by permanent virtual circuits. The mesh of virtual circuits can be as sparse as a spanning tree, but will normally consist of a denser set of connections for reliability. The routers use extensions to OSPF (Open Shortest Path First) mechanisms to calculate optimal paths in the permanent topology. The routers can further take advantage of both intra-area and inter-area shortcuts through the layer 2 network to improve network performance. The routers pre-calculate shortcuts using information from link state packets broadcast by other routers and store the shortcuts to a given destination in a forwarding table, along with corresponding entries for a next hop along the permanent topology. The present invention allows the network to continue to operate correctly if layer 2 resource limitations preclude the setup of additional shortcuts, if for example the necessary connection capacity is temporarily in use. Packets can still make use of the virtual circuits in the permanent topology if a shortcut cannot be setup.

These and other advantages of the invention will be apparent to those of ordinary skill in the art by reference to the following detailed description and the accompanying drawings.

BRIEF DESCRIPTION OF THE DRAWINGS

FIG. 3 is a chart of intra-area connectivity information to be encoded in a link state packet.

FIG. 4 is an example of variables generated to reflect intra-area connectivity information.

FIGS. 5 through 10 are diagrams of different network topologies and connectivity schemes.

FIGS. 7A and 8A are connectivity diagrams corresponding to the network topologies set forth in FIGS. 7 and 8.

FIG. 13 is a chart illustrating combinations of inter-area shortcuts.

FIG. 14 is a chart of summary shortcut information to be encoded in a link state packet.

FIG. 16 is a chart of inter-area connectivity information to be encoded in a link state packet.

DETAILED DESCRIPTION

Figure 1:
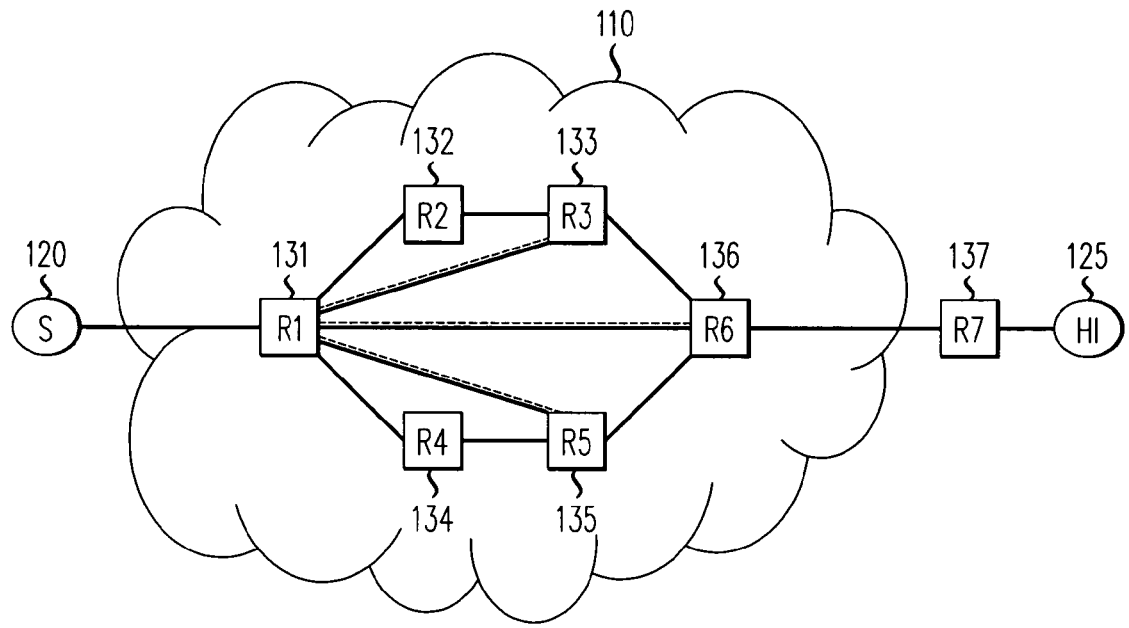
FIG. 1 is a diagram of a communication network illustrating an embodiment of the present invention.

With reference to FIG. 1, a diagram of a communication network 100 is shown illustrating an embodiment of the present invention. The network 100 has multiple routers 131-137, some of which are coupled to a connection-oriented non-broadcast multiple access (NBMA) network 110. For illustration purposes only, network 110 is assumed to be an ATM network, although those of skill in the art will easily recognize that the present invention has application to other connection-oriented networks. It is assumed that it is more efficient to traverse many hops of the routed 150 network by a single NBMA virtual circuit (shortcut). It is also assumed that the virtual circuits are in sufficiently short supply as to preclude interconnecting the routers in a single mesh topology, and that the overhead of setting up and tearing down virtual circuits is too costly for the connection-oriented network to directly emulate a connectionless network.

In FIG. 1, a source 120 is connected to a router 131 (R1) that is the ingress router on the NBMA network, and a destination 125, connected to router 137 (R7), which is not on the NBMA network. In the figure, routers that are connected to the NBMA network 131-136 are represented as being inside the "cloud" whereas routers not connected to the NBMA network are outside the "cloud."

I. Red Network

In accordance with the present invention, permanent virtual circuits (PVC) are configured between routers connected to the NBMA network in order to ensure that the routers in an OSPF area are fully connected. With reference to FIG. 1, the PVCs are represented by the dark lines between R1 and R2, between R2 and R3, and between R3 and R6. The mesh of PVCs may be as sparse as a spanning tree, but will normally consist of a denser set of connections for reliability. One preferred topology for the PVCs is to have two hub routers that have connections to each other and to all other routers. Other topologies are possible, such as augmenting the dual-hub topology with additional cross links based on historic traffic patterns or geographic proximity. This aspect of network design will be obvious to one skilled in the design of optimal network topologies.

The routers run a conventional neighborhood protocol on the PVCs to ensure that the connections are maintained and operating correctly. They report only correctly functioning links to the distributed topology calculation. In addition to PVCs, there may be other types of traditional links, such as point to point links, Ethernets, other broadcast links, etc. The inventors will refer to the totality of the PVCs and these links as "red" links, or as the "red network." The red network is represented in FIG. 1 as the dark lines between the source and the destination. The red network defines the topology available to non-shortcut routing. Accordingly, shortest paths on the red network (referred to herein as "red paths") can be calculated using conventional OSPF mechanisms.

It is possible to automatically configure the permanent topology. For example, one method of automating the dual-hub topology described above is to establish two hubs as "server" nodes and make their NBMA addresses known to each router. Upon initialization, non-server nodes establish NBMA connections to each server, thereby providing the necessary configuration information to establish the star topology. Details of such mechanisms are known in the art.

In an alternative embodiment of the present invention, switched virtual circuits (SVCs) are utilized instead of PVCs, so that pre-configuration becomes a layer 3 responsibility. This approach may be preferred when the NBMA implementation does not support PVCs or when the network operators prefer to have management operations implemented at layer 3 as much as possible (perhaps because there are organization boundaries between operations staff responsible for layers 2 and 3). In accordance with this embodiment, routers establish a pre-configured SVC upon initialization and attempt to reestablish SVCs upon any disconnection, thus emulating a PVC. Which embodiment to use should be the choice of the operators of a particular network, and the subsequent discussion shall refer to the permanent links as PVCs, regardless of whether they are actual PVCs or emulated PVCs.

II. Intra-Area Shortcuts

In accordance with the present invention, routers maintain two entries in their respective forwarding tables, for each destination address range: (1) a normal "next hop" OSPF entry calculated using the permanent topology (i.e., on the red path); and (2) a potential shortcut to a node closer to the destination than the normal next hop, i.e. to an egress router in the NBMA network on a shortcut path. The calculation of shortcuts is done locally at each router using the algorithm set forth below. Shortcuts are setup and torn down bilaterally by the two nodes at each end; no other nodes need be aware of the existence of the shortcut. This makes it possible to setup and tear down shortcuts rapidly 210 without generating any routing messages or waiting for them to be processed. Since no new messages are needed (other than the messages needed to calculate NBMA connectivity), the shortcut calculations proceed in parallel with the red path calculations using the conventional OSPF link state database and do nothing to affect convergence of the OSPF routing algorithm. Routers attached to the NBMA network can use a simple extension to the OSPF link-state routing protocol to add their ATM address and other information to their link state advertisements (LSAs), as in the Address Resolution Advertisement Option (ARA) proposed in the IETF.

The intra-area shortcuts are calculated in advance of possible need. A router can trigger the setup of a pre-computed shortcut based on some heuristic, such as a threshold count of packets to a destination subnetwork as an indicator that the route has become sufficiently "hot" to warrant a shortcut. The shortcut is enabled by creating a SVC. Upon setup of the virtual circuit, the forwarding process uses the shortcut next hop rather than the normal next hop until either a topology change has rendered the shortcut invalid or until the source end determines that there is insufficient traffic to warrant continued use of the SVC. In either case, the SVC is then released and the router reverts to using the normal next hop (it should be noted that some packets may be lost if the SVC is spontaneously disconnected).

A. Intra-Area Shortcut Connectivity

Before a shortcut can be setup to a destination other than the next hop on the red path, the router needs to know which local NBMA interface to use (there may be several) and what the NBMA address is for the downstream end of the shortcut. While a router knows of many other routers in its OSPF link state database, not all of them can be targets for possible shortcuts—a router can only establish shortcuts to routers to which it has NBMA connectivity, i.e. where the routers are on a common NBMA network. It also needs to associate a cost with every shortcut so that it can ensure that the shortcut is preferable to the next hop on the red path. Then the router can make the local policy decision to set up a shortcut connection and begin diverting traffic to one or more destinations over this shortcut.

In the simple case where the autonomous system has only one underlying NBMA network, a router will know that another router is reachable if it has an interface to this network. A fixed cost can be associated with the shortcut, and the routers can be limited to a single NBMA interface. In another embodiment, addressing at layer 2 and layer 3 could be arranged in such a way that a simple mapping could be used to derive layer 2 addressed from layer 3 addresses. NBMA connectivity can be configured in terms of NBMA addresses by manually defining sets of NBMA addresses on each network, normally by grouping addresses using address prefixes. Routers can then be configured with the set of addresses that are reachable from each of their interfaces.

A preferred and more general solution is to have each router run a distributed algorithm that discovers the NBMA connectivity associated with each of its interfaces. Such a procedure would simplify network management and would be robust in the face of NBMA network partitions. In general, NBMA connectivity between N interfaces can be arbitrary, with a complexity of $O(N^2)$ which precludes scaling to large autonomous systems. Fortunately, however, properly-functioning NBMA networks provide full connectivity among their interfaces. Thus, the problem is not one of determining arbitrary connectivity, but rather to identify connected NBMA networks and the corresponding router interfaces. Assuming NBMA level connectivity is transitive, each router can number its local interfaces and then group the interfaces into what the inventors refer to as a connectivity class. A connectivity class is a set of NBMA interfaces attached to one OSPF router that are connected to a single NBMA network and hence enjoy equivalent connectivity.

Figure 2:
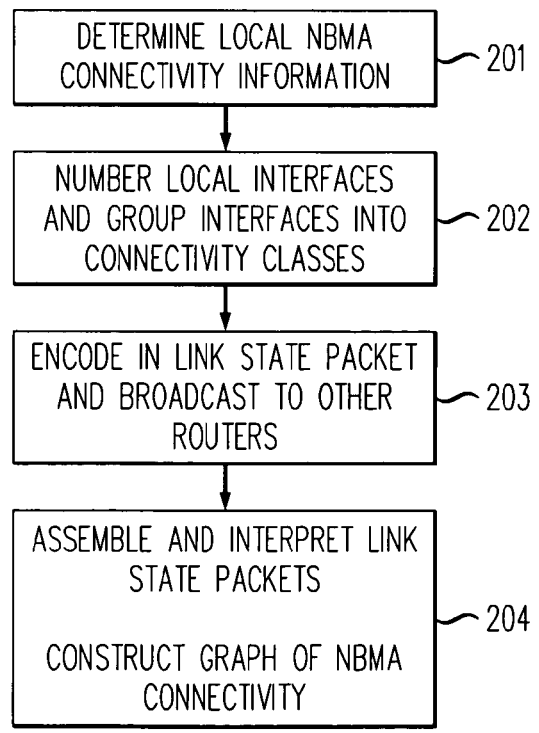
FIG. 2 is a flow diagram illustrating a procedure to determine intra-area connectivity in accordance with the present invention.

FIG. 2 is a flow diagram illustrating a procedure to determine NBMA connectivity in accordance with the present invention. At step 201, the router uses one of several local methods to determine whether the router's interfaces are connected to the same NBMA network. Where the router has a single interface, the problem is trivial. Where the router has multiple interfaces, local connectivity information can be determined by manually configuring the connectivity class for each NBMA interface on the router. This can be done by a number of known ways, most typically using management protocols such as SNMP. Local connectivity can also be ascertained experimentally, for example by attempting to set up connections among the interfaces. If a connection is established, and simple connectivity tests can ascertain that it is indeed talking to itself and not some other router with a duplicate NBMA interface address, the router can conclude that the two interfaces have connectivity.

At step 202, the router then numbers its local interfaces and then groups the interfaces into connectivity classes using the local connectivity information. One way of numbering would be to order the NBMA interfaces in some fashion and begin numbering the connectivity classes starting with the first interface, assigning subsequent numbers as unconnected interfaces are discovered. The exact method of assigning these numbers is immaterial and has no permanent significance. The number is local to the router, since other routers can qualify it by appending the OSPF Router ID. Moreover, the number can be redone at anytime by issuing a new link state packet. Nevertheless, keeping the numbers dense will facilitate processing at other routers.

At step 203, the router encodes the local connectivity information into a link state packet that is broadcast to other routers in the layer 3 network. For example, the information can be in the form set forth in FIG. 3. Note that it is not necessary for the link state packet to include cost information. The connectivity does not depend on the cost (each router can determine shortcut costs according to its own policy, the only requirement being that the cost must be positive). The connectivity information could be encoded into opaque fields added to an OSPF link state advertisement, enabling the information to pass through routers that are not aware of the present invention. The exact OSPF coding details could be standardized and would be obvious to one skilled in the art. Note that the regular OSPF link state packets describing neighbor connectivity do not mention interface class, so this information must be added using opaque OSPF coding conventions (this information can also be broadcast using a separate link state packet).

At step 204, each router assembles and interprets the link state packets and proceeds to construct a graph of NBMA connectivity. A conventional graph connectivity algorithm can be used to determine all of the interfaces, and hence routers, to which it has NBMA connectivity. Graph connectivity algorithms do not need to examine edges of a graph more than once and hence are efficient. The output of a router's connectivity calculation is (1) a list of local NBMA interfaces and their connectivity class number; (2) for each local connectivity class, a set of reachable distinct connectivity classes, specified by OSPF Router ID and Connectivity Class number; and (3) for each reachable connectivity class the NBMA interface address or addresses. Cost information and choice of best interface can then be added by applying the layer 2 cost function and selecting the lowest cost combination of interfaces should there by multiple possibilities. An example of NBMA connectivity information generated for use in the shortcut calculations is set forth in FIG. 4.

There are several methods for determining shortcut costs: for example, a shortcut cost could be associated with all shortcuts initiated by a specific router, with each interface on a router, or with each pair of interfaces on an NBMA network. In accordance with the present invention, shortcut cost information is used locally so there is no need to standardize how this information is obtained or encoded. In keeping with the architectural approach of separating layer 2 and layer 3, the cost should be fixed as a function of individual router interfaces, although more complex methods could be used. It is assumed that the layer 2 mechanisms in a router export the necessary cost information to the layer 3 mechanisms in the form of a cost function that may be time-varying. There is no need to propagate information in layer 3 should shortcut costs change. As far as layer 3 is concerned synchronization between layer 2 cost changes and layer 3 shortcut calculation is purely local, simplifying synchronization across layers.

The above procedure is robust against incorrect connectivity information. Routers, based on a lack of information or incorrect information, may calculate a sub-optimal or unworkable shortcut, but the packet will always progress to the destination. If a router has an incorrect NBMA address, a shortcut to an unintended router will be immediately rejected when it is ascertained that the OSPF router ID does not match the expected value (otherwise, incorrect NBMA address information might lead to a routing loop). If shortcut connectivity cannot be established, for whatever reason, there will be no user-level loss of connectivity, since the router still has the regular next hop on the red path for forwarding packets.

Figure 5:
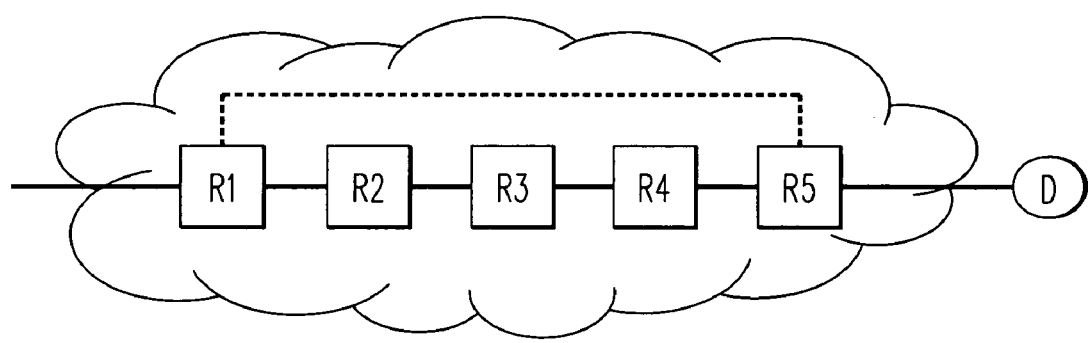
Figure 6:
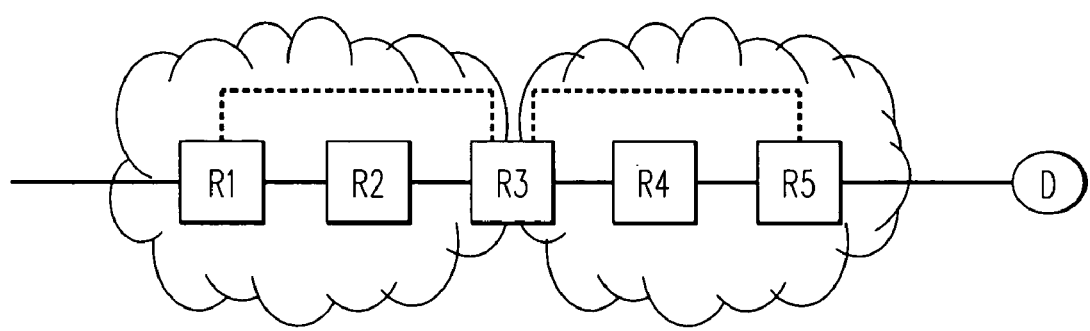

FIGS. 5-10 illustrate several examples of NBMA networks and connectivity graphs. Squares denote routers while circles denote a destination host. Solid lines denote links in the red network, while heavy solid lines denote links on the red path to the illustrative destination. Dotted lines denote potential shortcuts to the destination. For simplicity, the diagrams show interface classes, not individual interfaces. FIG. 5 shoes how a shortcut can be established where there is a single NBMA network. Each router has a single NBMA interface class, and there is full connectivity at the NBMA level. Router R1 is able to setup shortcuts to all routers, and in particular has direct connectivity to the best exit router, R5 (R1 might establish shortcuts to R3 and R4 when routing traffic to other destinations). FIG. 6 shoes two NBMA networks bridged by R3 which has two interface classes (and hence at least two interfaces). Router R1 will determine its NBMA connectivity to be R2 or R3 and its best shortcut for D will be to R3. R3 has connectivity to R4 and R5 and will compute its best shortcut to R5. FIG. 7 shows two parallel NBMA networks, as might be used for high availability. In this example, the red path uses the top network, but shortcuts may use either network (the choice of shortcut would depend on the NBMA shortcut cost parameters at R1). Notice that the PVCs in the bottom network do not carry traffic destined to D. However, were these PVCs to be removed it would no longer be possible for R1 to determine that it had shortcut connectivity to R5 through the lower network.

Figure 9:
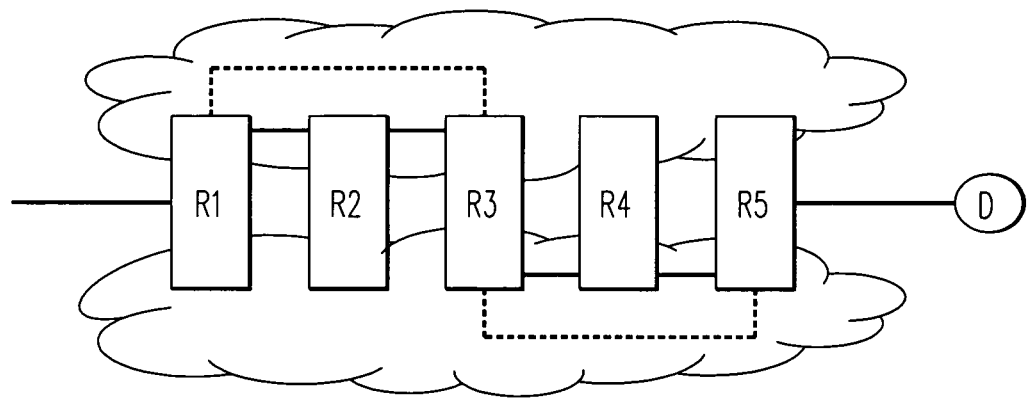
Figure 10:
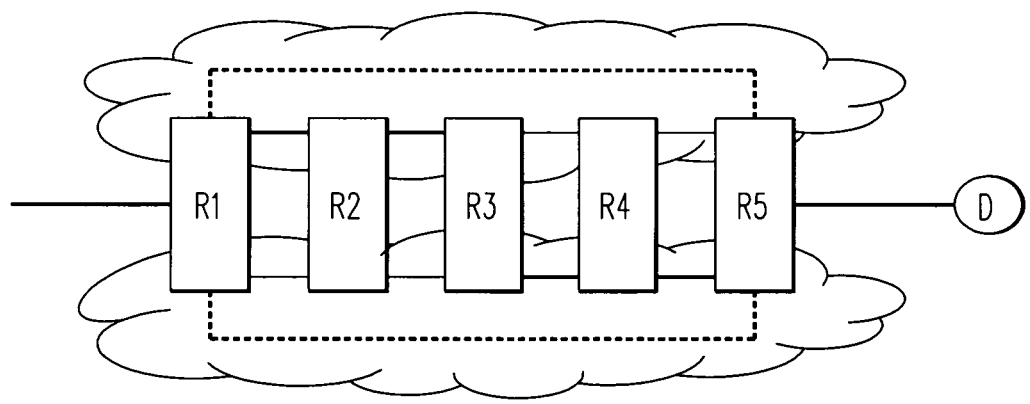
Figure 11:
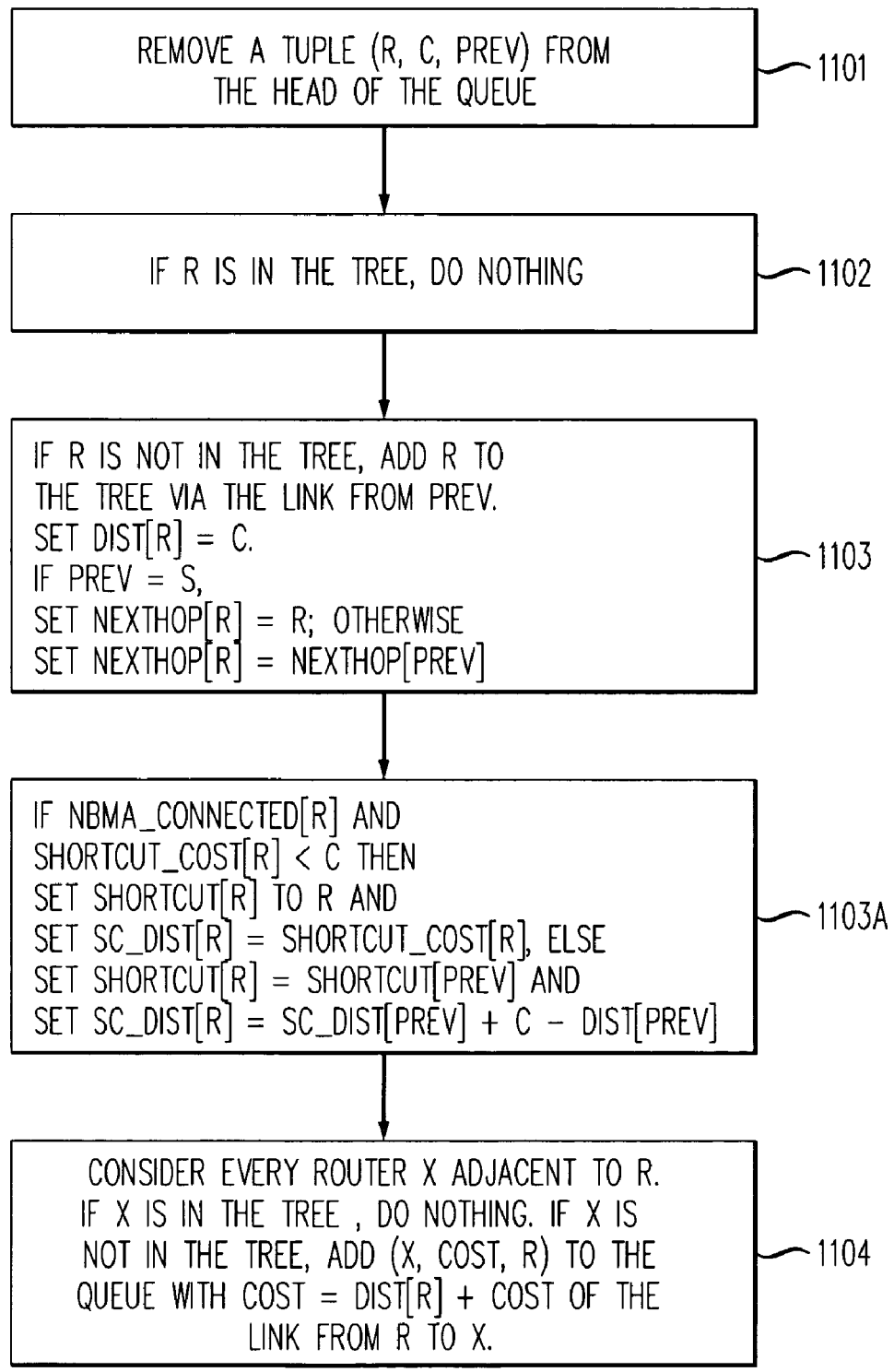
FIG. 11 is a flow diagram illustrating the augmented Dijkstra's algorithm.

More complex topologies are possible and can be handled by the present invention. FIG. 8, for example, shows three NBMA networks. The top network has full connectivity while the bottom two networks have limited connectivity (this case might arise from a partition of the lower NBMA network in FIG. 7). Router R3 has three connectivity classes, and hence at least three interfaces. This example shows the importance of determining NBMA connectivity by interface class. Router R1 has full connectivity through its top interface, but only partial connectivity through its bottom interface. If R1 considers all shorts to be of equal cost, it will prefer a shortcut to R5 via the top network. The next example, FIG. 9, is unusual perhaps even pathological. As in previous example, there are dual NBMA networks, but the red path toward D uses both networks. Although all the routers are actually on both NBMA networks, the connectivity algorithm is unable to determine this because insufficient PVCs have been setup. As a result, R1 determines it has no shortcuts at all on the lower network and R3 determines it has no shortcuts on the top network. Because there is inadequate connectivity information for use by the connectivity algorithm, the best shortcut that can be calculated uses two hops. In the final example, FIG. 10, the problem has been rectified. PVCs provide connectivity to both NBMA networks and hence the connectivity algorithm is able to determine that both NBMA networks are fully connected. There are two possible best shortcuts, as shown. The fact that the red path uses both networks is of no significance to the connectivity algorithm (nor to the shortcut algorithm presented below). The connectivity algorithm is only concerned with links (and the shortcut algorithm is only concerned with the sequence of the routers on the red path).

Two examples of connectivity graphs constructed by routers using the present invention to calculate NBMA connectivity are shown in FIGS. 7A and 8A (which correspond to the network diagrams in FIGS. 7 and 8). The notation Rx/y refers to router x, connectivity class y. Notice the connectivity class numbers have only local significance. In FIG. 7A, router 3 has two distinct connectivity classes, as expected.

B. Intra-Area Shortcut Calculation

Using the above intra-area connectivity information with the conventional link state database, routers pre-calculate the "best" shortcuts for all destinations using an augmented version of the commonly used shortest-path-first or Dijkstra algorithm. A queue of entries corresponding to visited routers, sorted by their distance from a router S, is maintained during execution of the algorithm. Each entry in the queue is a tuple: (router, distance from S, previous hop router). The algorithm also maintains a table DIST[i] containing the distance of each router i on the tree from S, and a table NEXTHOP[i] of the next hop from S on the shortest path tree to each router j. Each entry in DIST[i] is initialized to the cost from S to the router i (for routers adjacent to S), or infinity (for routers not adjacent to S). Each entry in NEXTHOP is initialized to none. The queue initially contains (S, 0, none). The conventional Dijkstra algorithm computes a shortest path tree from a router S to every other router as follows:

1. Remove a tuple (R, C, PREV) from the head of the queue.
2. If R is in the tree, do nothing.
3. If R is not in the tree, add R to the tree via the link from PREV. Set DIST[R]=C. If PREV equals S, set NEXTHOP[R]=R; otherwise, set NEXTHOP[R]=NEXTHOP[PREV].
4. Consider every router X adjacent to R. If X is in the tree, do nothing. If X is not in the tree, add (X, COST, R) to the queue with COST=DIST[R]+the cost of the link from R to X.

Dijkstra's algorithm is augmented by adding the following step to step 3:

3a. If NBMA_Connected[R] {the shortcut is available} and Shortcut_Cost[R] is less than C {the shortcut is feasible} then set SHORTCUT[R] to R, and set SC_DIST[R] to Shortcut_Cost[R], else {the shortcut is unavailable or infeasible},
set SHORTCUT[R]=SHORTCUT[PREV], and
set SC_DIST[R]=SC_DIST[PREV]+C−DIST[PREV]

This step computes a table SHORTCUT[i], containing the OSPF Router ID that represents the lowest cost feasible NBMA shortcut from S to router i, and a table SC_DIST[j] which computes the cost to j when using the shortcut. A feasible shortcut implies that the router associated with SHORTCUT[i] is on the shortest path tree to i, as computed by the conventional algorithm, and that the cost of using the shortcut is lower than the cost along the shortest path tree. Each entry in SHORTCUT is initialized to zero. Each entry in SC_DIST is initialized to infinity. The shortcut connectivity information, NBMA_Connected[R] and shortcut cost information, Shortcut_Cost[R], from FIG. 4, are used to determine if S and R are in a connected NBMA component if the shortcut is feasible (the additional NBMA connectivity information in FIG. 4 is not needed at this point but is used later to setup the shortcut).

The algorithm ensures that the shortcuts do not introduce any permanent routing loops. All shortcuts calculated will be to nodes downstream on the red path. For example, in FIG. 1, router R6 is the last node on the NBMA network along the red path to the destination, hence the algorithm will compute a shortcut to R6—and not R5 (which is not on the red path) or R3 (since it is not the best shortcut on the red path). When a node is added to the tree that is off the NBMA network, the best shortcut is to the last node that was on the NBMA network, along the path to the current node. This ensures that the shortcut endpoint is a router that is on the NBMA network and as close as possible to the destination along the red path. Every entry in the forwarding process (normal and shortcut) points to a next hop that is closer to the destination in the chosen metric. Thus, at all times except while link state updates are being propagated or processed, the directed graph consisting of all of the forwarding entries for a given destination can be totally ordered using this metric and, hence, is acyclic.

Shortcut calculations are performed whenever the OSPF link state database changes or when NBMA connectivity changes. Changes may result in new shortcuts or removal of old shortcuts. Since the OSPF routing algorithm is self-stabilizing the augmented algorithm with shortcuts will also be self-stabilizing. By ensuring that routers only forward packets on the current red path or current "best" shortcut (if any) the actual forwarding of data packets in the network will also be self-stabilizing. The present invention provides an automatic method to continuously validate shortcuts.

One concerns is how this algorithm copes with area partitions due to a break in the permanent topology. So long as the backbone area is not affected, OSPF handles the situation by splitting the area into separate areas. In other words, area membership in OSPF is dynamic. When an area splits up, an intra-area shortcut may be invalidated. This occurs when the intra-area routing algorithm determines that the downstream end of a shortcut is no longer reachable within the area, and hence can not legally be used for the intra-area shortcut. The node may still be reachable across the backbone. In this case, depending on the policy used by inter-area routers for establishing inter-area shortcuts (see below), it may be that an inter-area shortcut is possible. It is possible that a new shortcut will be established that is equivalent to the original one. Depending on the heuristic used for establishing and terminating SVC shortcuts between routers, it is even possible that the same SVC might be used to carry traffic for both shortcuts. This is desirable because it minimizes the NBMA connection management overhead required following an OSPF area partition.

C. Forwarding

The present invention, accordingly, gives individual routers autonomous choice between two pre-computed next hops for each destination: the normal red path next hop and an alternative shortcut next hop. A range of implementation alternatives and heuristics can be used in the forwarding process that chooses between the alternatives. For example, the traffic driven local policy decision to establish a shortcut can be driven by statistics. Following the general Internet architecture, routers can forward packets based on destination address with a longest prefix match if there are several matching entries in the forwarding table. Any method for gathering statistics need not be finer-grained than address ranges in the forwarding database. Indeed, all routes that have a common shortcut next hop can potentially share a shortcut, so further grouping of routes by the value of the SHORTCUT field seems desirable. This can be done by a variety of schemes: one method is to index a counter by the SHORTCUT field when packets are forwarded. Another method is to accumulate traffic counts per forwarding table entry and periodically tally them by SHORTCUT field.

Shortcut connection setup includes, at a minimum, selecting a particular router as the target for a new shortcut, resolving its Router ID to a local interface number and NBMA address (as described above), and establishing a layer 2 connection to the target router, for example by establishing an ATM SVC. At this point, data can then be sent on the new shortcut connection. It is advantageous for the router to also send a short PDU identifying itself and its intended neighbor, using the layer 3 Router ID field. This will prevent address resolution errors from creating packet loops, since an unintended downstream router can break an erroneous layer 2 connection. It would also be possible to detect and resolve connection setup collisions, which occur should two routers simultaneously attempt to establish shortcut connections to each other.

Shortcut connection setup, which happens on a router-to-router basis, should be distinguished form traffic diversion, which happens for each forwarding table address range in an individual router. A single shortcut connection can potentially affect many routes—there can be many entries in the forwarding database having the same value of SHORTCUT field. Maintaining synchronization between shortcut state and the forwarding engine may be very simple in some router implementations (e.g., changing a bit of shortcut connection state) or it may be more costly (e.g., changing the value of multiple entries in hardware tables). There is no need for tight synchronization when establishing new shortcut connections. On the other hand, if a shortcut connection is torn down before restoring traffic to the red path, packets will be lost, which should not happen during normal shortcut resource management. This implies a need for a graceful close in the bilateral shortcut setup protocol.

Following a network topology change, there is a critical synchronization issue. Traffic must be prevented from going to neighbors that are no longer the proper next hop (red path or shortcut), otherwise there will be routing loops. This problem is shared with other routers; they differ only in having two next hop fields that may change. Note that shortcut connections may become useless following a topology change. It is suggested that connections be reclaimed on the basis of a timer. Immediate reclamation may be unwise as it leads to the possibility of churning layer 2 connection resources during layer 3 routing transients.

D. Alternative Embodiments

The augmented Dijkstra's algorithm is sufficient but not necessary to ensure loop-free routes. An alternate embodiment of the present invention using the same link state database can calculate better loop-free shortcuts by searching for nodes off the red path but closer to the destination on the red network. This approach, however, entails higher computational overhead. There is no requirement that all routers use identical algorithms to calculate shortcuts, so long as all shortcuts are to nodes closer to the destination in the red network. Indeed, a node might use the preferred algorithm when under heavy load while using a more costly algorithm at other times. One such costly algorithm performs a separate calculation for each destination. A router first calculates the distance of each router in the area from the destination along the red network, using a conventional algorithm. Next, it discards all routers which are not closer to the destination than the router itself. Next, it discards all routers for which it did not have NBMA connectivity. Finally, it selects the remaining router (if any) that minimizes the path cost along a shortcut followed by the subsequent red path. This algorithm has a complexity of at least $O(N)$ for each destination and hence at least $O(N^2)$ considering all destinations, where N is the number of routers.

Rather than calculating shortcuts using the augmented Dijkstra's algorithm, it is also possible to calculate shortcuts in a manner more compatible with a conventional distance vector protocol, such as IGRP. In a distance vector protocol, the router advertises its distance to every destination in a "distance vector update," rather than advertising its links to adjacent routers. When a router receives a distance vector update from one of its neighbors, it checks, for each destination, if the distance is less than its current distance. If so, the router selects the neighbor as its next hop to the destination, increments the distance (hop count) to that destination by one, and advertises this distance over every one of its links except the one on which it received the update (otherwise known as the "split horizon" rule). After a router fails to hear an advertisement for a destination for a time-out period, it removes the neighbor as the next hop to that destination. Information about a destination, accordingly, propagates away from the router to which the destination is attached toward potential sources.

In accordance with another embodiment of the present invention, NBMA-attached routers add a "shortcut advertisement" to every distance vector advertisement they send for which the next hop is via an interface that is either a non-NBMA interface or an NBMA interface that is not in the same interface class. The shortcut advertisement consists of the router's unique Router ID (e.g. IP address) and distance from the destination. Routers propagate this information without modification within an NBMA network, following the usual split horizon rule. The information will propagate to every router within the routing domain. Routers then determine that a shortcut is feasible as before: a shortcut to an egress router is feasible if the distance (cost), consisting of the shortcut cost plus the cost from the egress router to the destination, is less than the cost computed by the conventional distance vector protocol. Note that this procedure only supports a single NBMA network. If there are multiple NBMA networks, it is possible to carry multiple shortcut advertisements. Alternatively, a policy could be established of not propagating shortcut advertisements across distinct NBMA networks. It should be noted that distance vector protocols do not provide a suitable mechanism for transferring opaque data, making it likely that all routers in an area will need to be aware of the present invention before shortcuts can be established.

III. Inter-Area Shortcuts

Figure 12:
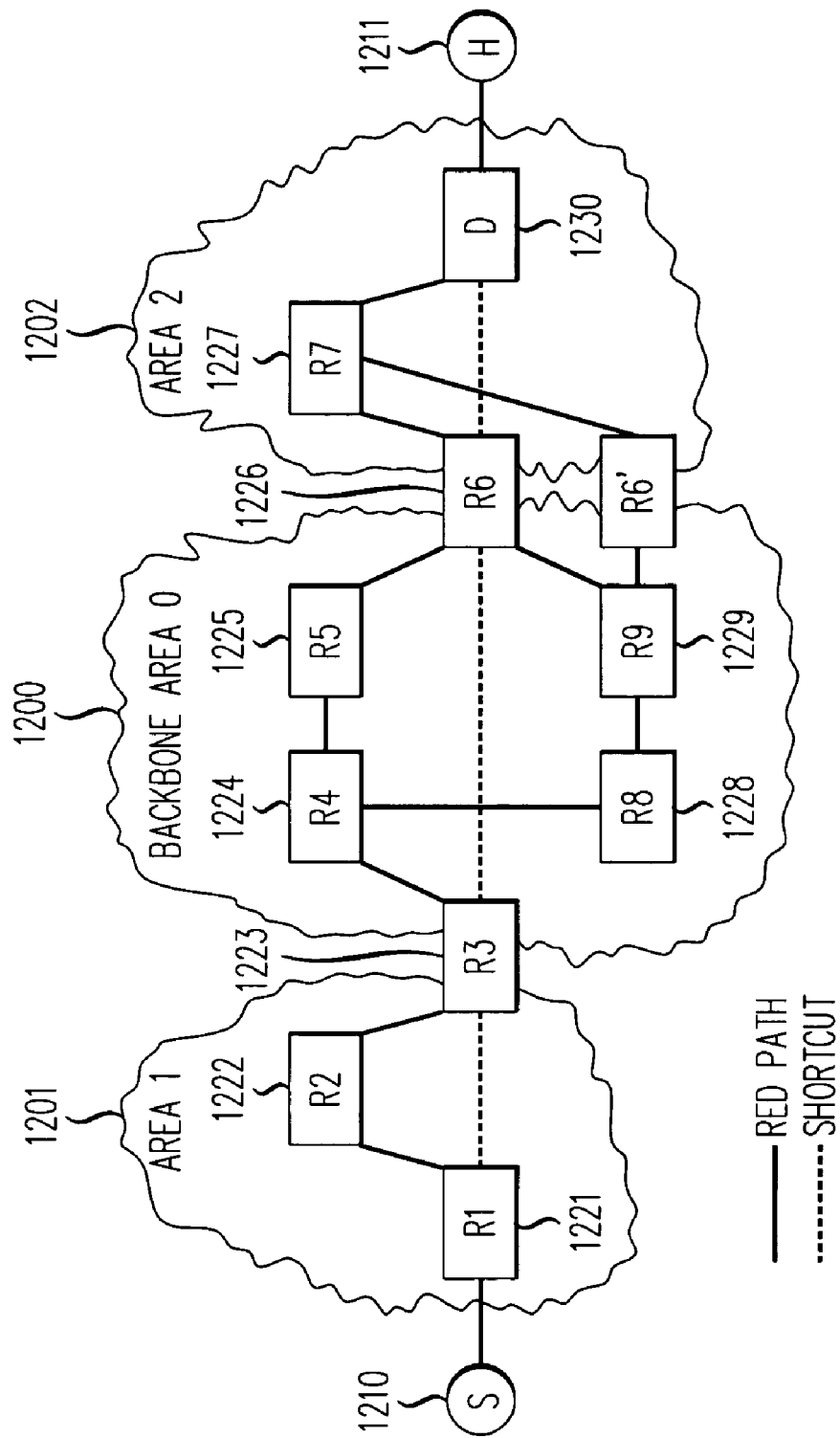
FIG. 12 is a diagram of a communication network having three separate subnetworks illustrating an embodiment of the present invention.

Use of intra-area shortcuts as described above ensures that heavy traffic flows traverse a minimum number of routers within an OSPF area. Where all of the routers are on a single NBMA network, traffic flows in an area need traverse only the ingress and egress routers. Consider, however, a traffic flow between routers in different OSPF (non-backbone) areas, as illustrated in FIG. 12. In FIG. 12, traffic flows from source (S) 1210 to destination (H) 1211 across three OSPF areas: a backbone area 1200 and non-backbone areas 1201 (Area 1) and 1202 (Area 2). In normal operation using the permanent topology, OSPF requires that all traffic must flow through area border routers: one border router 1223 (R3) between the ingress area and the backbone and the other border router 1226 (R6) between the backbone and the egress area. Even if intra-area shortcuts were used within each of the areas (e.g. set forth in FIG. 12 as dotted lines between ingress router 1221 (R1) and border router 1223 (R3), between R3 and area border router 1226 (R6), and between R6 and egress router 1230 (D)), there would still be a minimum of three hops where it may be desirable to have only one. The result is congestion at the area border routers and extra physical link (e.g. fiber hops) if the area border routers are not integrated into the NBMA switch. Accordingly, it is advantageous to provide a mechanism for inter-area shortcuts.

There are several combinations of shortcuts that may be used in inter-area routing, the most common cases are set forth in FIG. 13. In the figure, IR stands for ingress router (e.g. R1 in FIG. 12), ABR1 stands for area border router in the source area (e.g. R3), ABR2 is an area border router in the destination area (e.g. R6), and ER is the egress router (e.g. D). Note that once an inter-area shortcut has been setup for one route, it makes sense to use it for other traffic on the path, even though the latter traffic by itself did not justify the shortcut. Thus, it is possible for all four combinations of shortcuts to be useful, given traffic to multiple destinations. On the other hand, setting up a shortcut may reduce the traffic flowing over a pre-existing shortcut, even below the threshold that justifies the use of the shortcut. This competition between shortcuts and interaction between multiple destinations makes the resource allocation problem complicated, since multiple routers might be working at cross purposes. Inter-area shortcuts may only be worthwhile if traffic for multiple source-destination pairs can be aggregated into a single shortcut. The Internet architecture uses destination-based routing. Aggregation of destination addresses can therefore be achieved by combining traffic for multiple destinations onto a single shortcut. Traffic from multiple sources can also be aggregated by controlling which node initiates a shortcut. This node will naturally aggregate traffic from all sources that are upstream.

A. Exporting and Importing Inter-Area Shortcuts

In accordance with the present invention, area border routers export summary shortcut link state advertisements into the backbone that represent the best possible shortcut to address ranges within an area. These LSAs represent possible shortcuts that may be used by other routers within the backbone, or may be propagated into stub areas. It is assumed that stub areas are connected through a backbone, as is a requirement of OSPF routing. In OSPF, area border routers are responsible for summarizing and advertising intra-area reachability into the backbone. Since backbone border routers summarize and advertise inter-area reachability information from the backbone into an area, they may also propagate these summary shortcut LSAs into the area. A preferred embodiment of the invention combines the summary shortcut information with the conventional summary link state packets used by OSPF for inter-area routing (although it would also be possible to send this information in separate link state packets).

The link state advertisement includes the following conventional information (omitting other fields required by the OSPF specification for simplicity): (1) the OSPF Router ID of the issuing Router; (2) the set of reachable IP addresses; and (3) the maximum conventional cost. In addition, the following new shortcut information is provided in an opaque type so that it does not affect conventional routers that do not support shortcuts: (4) the OSPF Router ID of the shortcut target; (5) the exit cost from the target router to the destination address (es); and (6) the NBMA connectivity information, which is described below. This information is set forth in a chart as FIG. 14 (with examples taken for an LSA broadcast by R6 in FIG. 12).

Coupling the mechanism for discovering inter-area shortcuts to OSPF takes advantage of the fact that OSPF provides a consistent, if not necessarily accurate, metric across an entire autonomous system. If shortcuts also obey this metric, i.e. only proceed "down hill", then there can be no looping even if individual routers are making autonomous shortcut decisions. As in the intra-area case, the topology may change (either the conventional OSPF topology or the NBMA connectivity information). However, as in the intra-area case, should a topology change occur, routers will calculate new loop-free shortcuts.

FIG. 12 is used to illustrate the mechanisms for exporting shortcuts from non-backbone areas into the backbone area, how backbone routers use exported 620 shortcuts, and how backbone routers export the shortcuts into non-backbone areas.

IMPORTING SHORTCUTS INTO BACKBONE AREA. With reference to FIG. 12, consider the shortcuts that may be taken for a packet travelling from S (1210) to H (1211). In Area 2 (1202), router R6 knows that there is a possible shortcut to D using the intra-area mechanism. R6 accordingly issues a summary shortcut LSA that covers the address ranges reachable through D (including H). As in the case of conventional OSPF inter-area routing, area border router R6 may elect to combine many destination addresses into a single shortcut. This will be efficient where addresses have been assigned to have topological significance. For example, R6 may provide a range of addresses using an IP address prefix and mask that includes nodes D and H, as well as possibly other nodes. Of course, if R6 does this it will face the problem that different destinations have different exit costs (in the above example, the cost to go from D to D will be zero, while the cost to go to H will be greater than zero). As with conventional OSPF aggregation, R6 equalizes costs by adding cost for less costly destinations, such that the advertised cost is the maximum of the costs associated with the reachable address ranges.

As with conventional OSPF inter-area routing, an area-border router may exercise discretion in the number of shortcuts it exports (R6 may issue overlapping shortcuts as with conventional OSPF inter-area routing). For example, R6 might choose to limit the number of shortcuts it issues into the backbone to prevent the link state database of other routers—such as R3—from growing excessively. It can make these decisions based on heuristics, described below. Note that heuristics controlling inter-area shortcuts are different from heuristics a router uses to establish shortcuts. When an area border router exports different inter-area shortcuts it affects many nodes which have to process link state advertisements and calculate new shortcuts. When a router uses a pre-calculated shortcut, its decision is local and affects only itself and the neighbor at the end of the shortcut.

BACKBONE AREA SHORTCUT CALCULATIONS. Routers in the backbone area receive the summary state LSA as well as a conventional OSPF summary link advertisement that describe a route to D in its database. The routers proceed to calculate inter-area shortcuts as follows (using router R3 on FIG. 12 as an example): During the shortest path calculation for D, R3 follows the red path to R6 and creates a new route (along the red path) to D. R3 also discovers an intra-area shortcut to R6 using the procedure described above. At this point, R3 has also discovered that R6 has included a summary shortcut LSA for D, describing a possible inter-area shortcut terminating at router D. If R3 does not have NBMA connectivity to D, then its best shortcut for this route would end at R6 (or earlier if that was what the intra-area mechanism had computed). In the example, however, R3 does have NBMA connectivity to D, and hence there is a possibility of a better shortcut. R3 compares the cost of this new shortcut (its cost of a shortcut to D plus the extra cost of the shortcut contained in the summary shortcut LSA) with its cost to D along the red path. If the shortcut cost is lower, the new shortcut is feasible and R3 enters it into its forwarding tables as the best shortcut for the route. R3 calculates its best shortcut for routes in Area 2 that have been advertised by R6. (If R6' also advertises shortcuts, R3 will use the intra-area algorithm to either determine whether R6 or R6' is on the red path and is thus the best source of shortcut information. It is assumed, without loss of generality, that this involves the shortcut advertised by R6). R3 is now ready to use a shortcut for packets it has that are going to D. R3 is also ready to advertise a shortcut to D into Area 1.

R6 may have advertised overlapping address ranges when it exported inter-area routes (even conventional OSPF inter-area routes). R3 will calculate shortcuts 670 for each of these ranges, as described above, and may have multiple overlapping shortcuts. A straightforward approach is for R3 to forward packets using the most specific shortcut it has. This will happen automatically if the forwarding process in R3 maps packets onto the most specific route, since the above calculations will have provided the best shortcut for this route.

Figure 15:
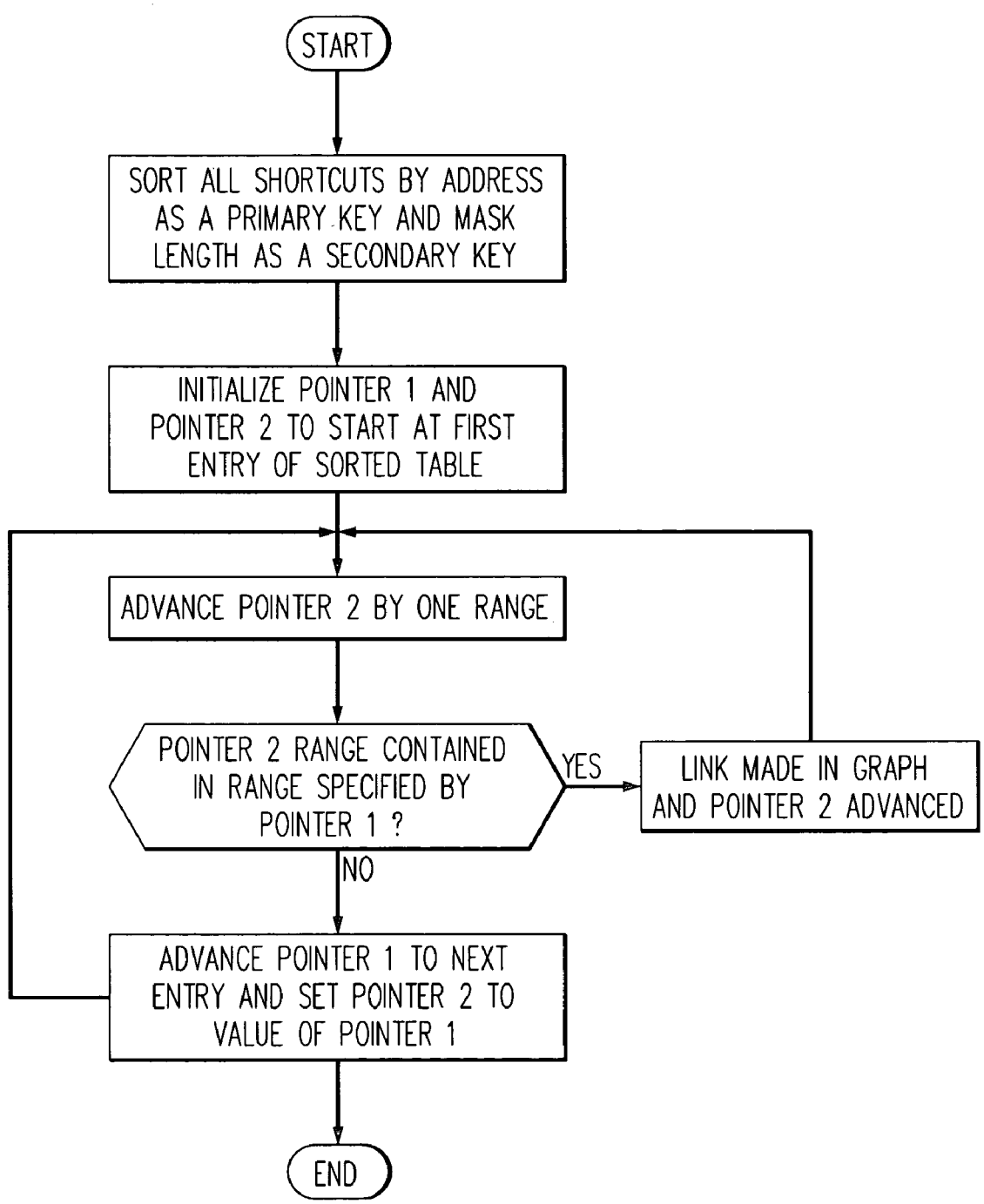
FIG. 15 is a flow diagram illustrating a procedure for constructing a directed graph used in determining non-specific shortcuts for a given destination.

In some inter-area cases, however, it may be desirable for R3 to map packets onto a less specific shortcut, for example if there is a sufficient traffic to justify maintaining one SVC for a general shortcut but insufficient traffic to justify maintaining many SVCs for specific shortcuts. One method of determining candidate non-specific shortcuts is for R3 to construct a directed graph, where each node of the directed graph is an inter-area shortcut and a link exists between nodes if the address ranges overlap. A straightforward way of constructing the graph is to consider all possible pairs of inter-area shortcuts when creating links, but this method will not scale with large numbers of shortcuts. It is, however, possible to perform this calculation efficiently using the method set forth in FIG. 15 to construct the links in the graph. Using such a graph, there are a number of methods to determine all of the non-specific shortcuts for a given destination. For example, one way would be for the forwarding process to count packets transmitted to each destination address range as the packets are processed. At periodic intervals, the counts are tallied according to the graph structure, and the counts are then compared to threshold vales to determine which shortcuts are worthwhile, with the threshold values determined by heuristics. The details of such a procedure would be obvious to one of skill in data structures and algorithms.

EXPORTING SHORTCUTS INTO NON-BACKBONE AREAS. After the shortcuts become known to the routers in the backbone area, the backbone routers may not re-export the NBMA addresses of potential shortcut endpoints into other non-backbone areas. For example, router R3 in FIG. 12 may advertise the shortcut to D into Area 1. R3 has the same discretion in exporting shortcuts from the backbone area into Area 1 that R6 had when exporting shortcuts into the backbone area. These shortcuts may be either to routers in the backbone area (such as R6) or to routers in other areas (such as D). The link state advertisements and mechanisms used between R3 and routers in Area 1 are identical to those used by R6 when exporting shortcuts into the backbone area. Note that the potential shortcuts can be advertised regardless of whether any of the shortcuts from R3-R6, R3-D, or R6-D have actually been setup.

Normally, a router R1 would not know about the existence of R6 or D and would only be aware of the next hop router along the red path. During the execution of the augmented Dijkstra's algorithm, R1 may discover for a particular address range a shortcut to R3, a shortcut to R6, or a shortcut to D, and may incorporate the shortcut in its forwarding database. If R1, for example, chooses to establish a shortcut to D, then traffic from S to H bypasses the "routed" path (R1-R2-R3-R4-R5-R6-R7-D) by taking the shortcut. In addition, the shortcut is loop-free since the algorithm ensures that only valid shortcuts to nodes that are downstream along the red path are considered.

In another embodiment of the present invention, R3 may use local policy to limit the number of shortcuts it advertises into Area 1. Unlike the routers in the backbone area which generally have extensive processing and memory resources, routers in other areas may have more limited resources. A simple policy, for example, would be for R3 to advertise only the first/best 100 shortcuts. Traffic for a route with an unadvertised inter-area shortcut will proceed through R3 as normally (although it may traverse an intra-area shortcut in Area 1, such as from R1 to R3). Once the traffic reaches R3, it may of course follow subsequent shortcuts to R6 or D, as described above.

The above description deals primarily with a single border router. When there are multiple border routers, however, e.g. R6 and R6' in FIG. 12, the router R6' may receive advertisements about reachability from R6 through the backbone area. R6' knows not to import links from R6 since they are in the same area. R3 may receive advertisements from both R6 and R6' and they may have overlapping address ranges. R3 will determine the lowest cost along the red path for each address range, and will only consider potential shortcut advertisements form the router along the red path to the destination. R3 may advertise the resulting shortcuts for each distinct address range into its area.

The present invention adapts to changes in topology automatically. When there is a topology change, the routing algorithm in a router may determine that a shortcut 730 is no longer valid. The entry is immediately removed from its forwarding database (potentially a new shortcut entry is added). A typical behavior for idle shortcuts is to delete them after a period of inactivity, hence an invalid shortcut may be deleted automatically. In addition, invalid shortcuts will not be advertised in summary LSAs. For example, if R6-D is invalid, R6 will no longer advertise a shortcut to D into the backbone area. If R3 subsequently determines that R3-D is no longer a valid shortcut, it will withdraw the forwarding entry and stop advertising D's address into Area 1.

The inter-area shortcut mechanisms of the present invention have the advantageous side effect of adapting to traffic concentration to a "hot" spot. In a purely routed environment, one may wish to place a server in the backbone to minimize the number of area crossings. With the present invention, the server can be located in a stub area, and shortcuts from points that need to communicate with the server will be setup dynamically.

B. Inter-Area Shortcut Connectivity

As in the intra-area case, OSPF protocol mechanisms can be utilized to convey connectivity and address resolution information about inter-area shortcuts and can be extended by adding opaque LSA fields. Following the intra-area approach and the design of OSPF, layer 2 connectivity and address resolution information is separated from layer 3 routing information. The inter-area shortcut mechanisms identify potential shortcuts by OSPF Router ID (a layer 3 mechanism), and the NBMA connectivity and address resolution mechanisms take the Router Ids and calculate shortcut connectivity information, including layer 2 addressing and cost information. As with conventional OSPF inter-area routing, area border routers convey selected information across area boundaries, pruning this information according to heuristics to effect tradeoffs between efficient shortcut calculation and efficient shortcuts.

Inter-area connectivity information is encoded in OSPF link state packets and comes in two forms: (1) information about NBMA connectivity (addresses and connectivity classes) and (2) information about connectivity between routers (connectivity between connectivity classes). The first type of data is identical to the intra-area case and may be exported unchanged, apart from pruning unnecessary information. The second type of information, namely neighbor connectivity information, must be conveyed explicitly, because the OSPF area mechanisms hide information about links in other areas. The necessary information, also in opaque LSA format, is shown in FIG. 16.

An area border router exports data about its local area to the backbone area and imports data about other areas from the backbone. It does not reimport data that it or other area border routers in the same non-backbone area have already exported (this prevents routing loops because the OSPF topology is restricted to a star topology). Area border routers export connectivity information separately from shortcut information.

There is no need to keep this information precisely synchronized. Indeed, where two area border routers interconnect a pair of areas it is possible that one area border router might export shortcut information while another exports connectivity information. This would cause no problem for the network; however, without both shortcut and connectivity information, it will not be possible to calculate or use a shortcut. Hence, it is desirable that area border routers provide consistency when exporting shortcuts (there is no danger in exporting connectivity about routers that do not terminate shortcuts, but this will add unnecessary overhead).

Figure 17:
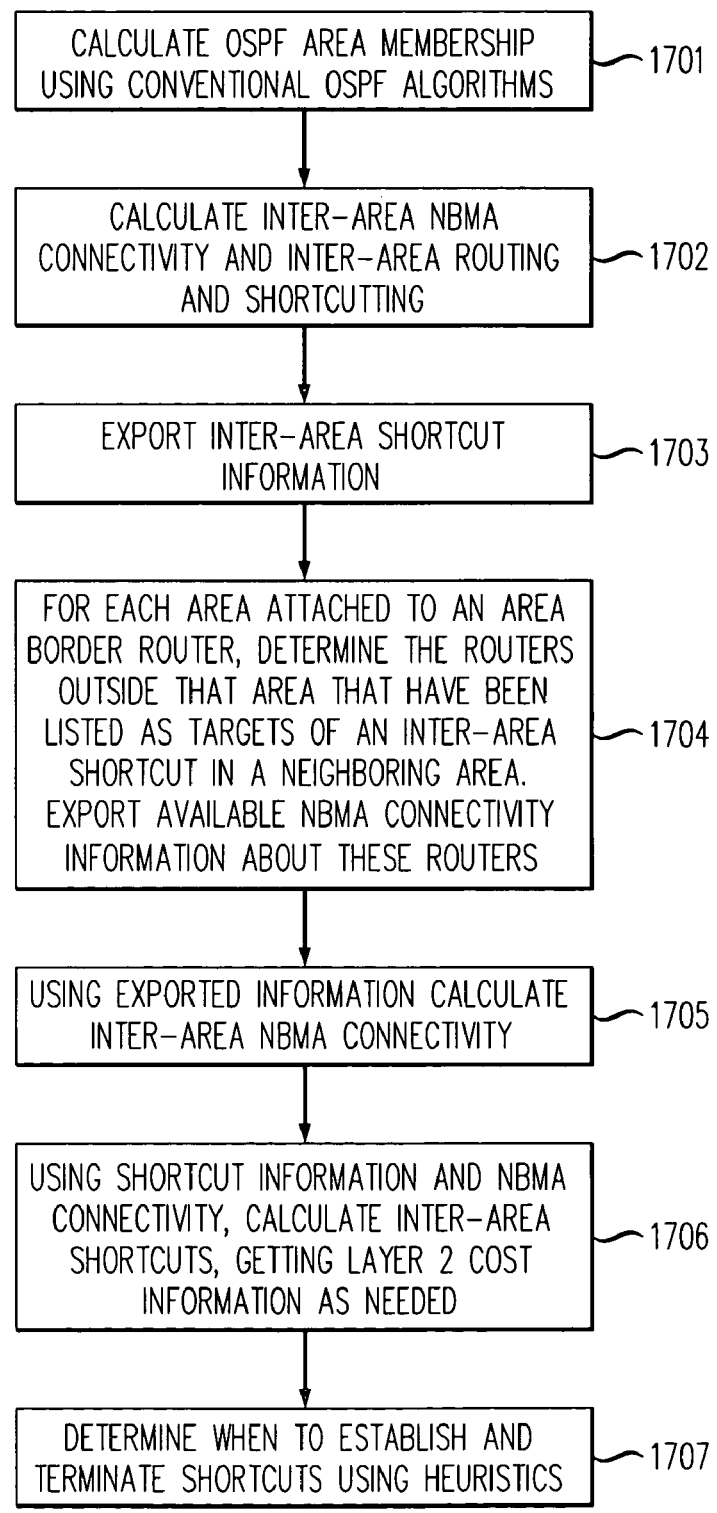
FIG. 17 is a diagram illustrating a method of calculating inter-area connectivity information and shortcuts.

A preferred method of calculating inter-area connectivity information and shortcuts consists of the stages set forth in FIG. 17. Intra-area shortcut decisions drive policy decisions at area border routers. Area border routers should follow a consistent order of information processing to ensure that shortcut calculations converge across an entire autonomous system. Although each router performs the stages sequentially, there are multiple routers in the network operating in parallel. The stages may overlap, taking a network-wide perspective. Each mechanism converges independently to correct values, assuming its input information is stable, and because information used by each stage depends only on earlier numbered stages, the overall system will converge.

Figure 18:
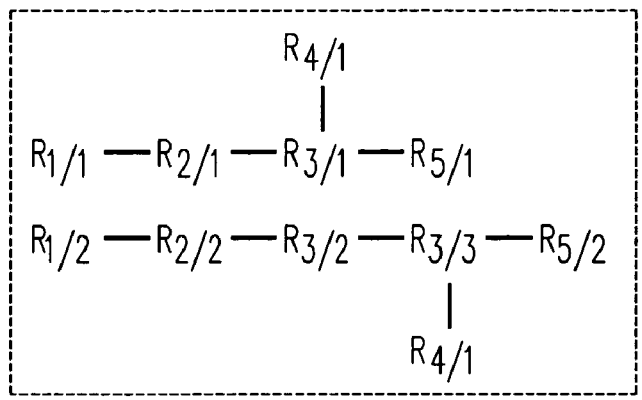
FIGS. 18 through 20 are connectivity diagrams illustrating inter-area connectivity.
Figure 19:
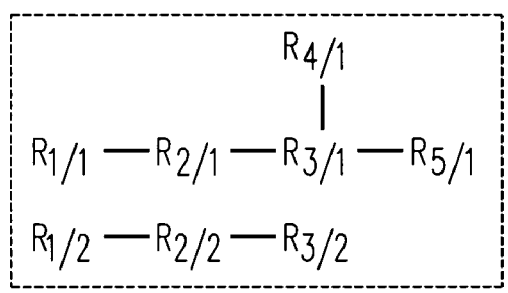
Figure 20:
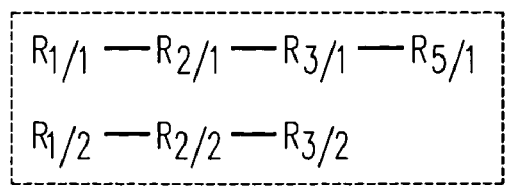

The processing of the NBMA connectivity information is illustrated by the following examples. With reference to FIG. 8, routers R1, R2, and R3 may be in one area, router R5 in a different area, and router R4 may be an area border router in both areas that chooses to export connectivity information about R5 (probably because it is also exporting shortcut information that involves R5). The resulting topology graph, as discussed previously, would be given by FIG. 8A. Without making any changes to NBMA connectivity, suppose that the OSPF areas have been reorganized, and that R1 and R2 are in one area, R4 and R5 are in another area, and that R5 is an area border router in both areas. Again, assume that R3 exports full information. In this case, R3 will export connectivity information showing that it has connectivity to R4 and R5. R4 is not an area border router and hence will not export connectivity information into the other areas. Connectivity, as seen for example by router R1, will be as set forth in the graph in FIG. 18. This example illustrates that R3 is exporting the results of its intra-area calculation and not the raw data. To do so, it performs the following operations: (1) determine the routers that belong to each OSPF area, using conventional OSPF means (in this case it determines that R3, R4, and R5 are in one OSPF area); (2) determine connectivity for each of its connectivity classes to each of these routers, using the connectivity algorithm on intra-area data, concluding that it has connectivity as shown to R4 and R5; and (3) export the resulting connectivity about R4 and R5 into the area containing R1 and R2. Alternatively, R3 might determine that there is no point in exporting connectivity information about the lower right NBMA network, as it concludes that R1 and R2 cannot use this network for any possible shortcuts (it could be aware of this in the given example because R3 has no connectivity to R1 and R2 on its connectivity class 3). Consequently, R3 might prune the exported information. The graph of connectivity information available to R1 would then be as set forth in FIG. 19. Finally, R3 might have made a decision not to export any shortcuts ending at R4. In this event, it would be expeditious for R3 to further prune the connectivity information it exports, resulting the graph available to R1 set forth in FIG. 20. If R3 is the only area border router connecting the two areas it will have immediate knowledge of shortcuts it is exporting and, hence, immediate knowledge of which routers terminate shortcuts, making it straightforward to perform the pruning operation. This might not be the case, however, if there were additional area border routers that could export shortcuts between areas. R3 still has access to their shortcut information, however, because it is a member of both areas and, hence, receives shortcut information exported by its peer area border routers.

C. Alternative Embodiments

Although the above method for calculating inter-area shortcuts is preferred, inter-area shortcuts can also be discovered by a mechanism that is not so coupled to OSPF routing. The inventors have devised an alternative mechanism for validating the loop freedom of shortcuts that could be a useful starting point when establishing shortcuts in conjunction with routing protocols other than OSPF. The mechanism proceeds as follows: it is assumed that there is a consistent cost metric. When a shortcut is first setup for a route, the downstream end provides its cost for the route to the upstream end, using a simple two party protocol across the shortcut. The upstream end rejects the shortcut for this route unless its own cost, calculated using the consistent metric, is higher. The downstream end is required to keep its cost synchronized with the upstream end whenever its own cost changes. This is a new routing protocol, but only a bilateral one. Synchronization is only between the two ends of the shortcut and hence has no effect on the global convergence of the routing algorithm. The upstream end must cease to use a shortcut whenever the monotonic decreasing relation in costs ceases to hold. This may happen when the downstream end gains cost or when the upstream end gains a newer path or reduced cost.

The inventors have also devised several alternate designs for discovering inter-area shortcuts that could be used within the general framework of the present invention. Border routers could autonomously splice shortcuts, based on traffic counts (this may be unstable considering possible shortcut configurations and hence costly to discover the best, i.e. longest, useful shortcut). Border routers could also use this same technique but pass control of splicing to the source end in an attempt to reduce instability. An entry router also could request potential shortcuts for a range of addresses. This request could travel on the routed path as far as possible until the range splits—or no more shortcuts are possible. This method is similar to the approach taken by NHRP. This approach does not find shortcuts that do not start at the entry router. Also, it requires good guesses as to possible aggregation. When making a request, a router should request as small a level of aggregation as necessary to achieve a worthwhile traffic level. Finally, it is possible to consider mechanisms in which the downstream end of a shortcut attempts to widen the range of addresses at a later time.

IV. External Routes

The present invention can incorporate external routes, just as it includes routes imported from a destination area into the backbone area or from the backbone area into a source area. The preferred embodiment of the present invention does not affect the details of exterior routing since the information exchanged and synchronized by OSPF and the Border Gateway Protocol (BGP) has been left unchanged. The present invention is transparent to the sequence of autonomous systems that a packet traverses and, accordingly, should not introduce any loops across autonomous systems. Loop freedom within an autonomous system requires that a consistent metric be used for making routing decisions. The present invention can utilize unchanged existing OSPF mechanisms for encoding external cost information into external link state advertisements.

For a shortcut to be transparent to inter-autonomous system routing, it is important that the Internal and Exterior Gate Protocol routing decisions be consistently synchronized. Equivalently, if all possible external route paths were likened to a forest of trees with each tree muted on an egress point, the shortcuts must be confined within individual trees of the forest. The present invention, by making shortcuts follow the red path, automatically meet this requirement. If the alternate embodiments of the present invention for calculating shortcuts is used, shortcuts must be constrained such that the downstream and upstream ends route to the same exit router in the red network. (It should be noted that there is a prior art method for avoiding the necessity of synchronizing the interior and exterior gateway protocol for transit network operation. When this method is used, which involves having the entry router encapsulate packets and sent them to the exit router or the BGP next hop), there is no interaction between external routing and shortcut calculations for transit traffic).

Packets destined for external routes must be delivered by an autonomous system to an egress router and not to the destination host specified in the packet. OSPF uses the pointer address field of external link state advertisements to specify this egress router (this field is not necessary when the egress router is the router issuing the LSA). Routers implementing the present invention can shortcut to the egress router provided there is NBMA connectivity and provided the egress router belongs to the autonomous system, by using the mechanisms described above. The present invention does not handle the case where the egress routers lie outside the autonomous system (for example, where the egress router is actually an entry router of a downstream autonomous system). The router can, however, be made to appear to be in the autonomous system for the purpose of NBMA connectivity calculations by, for example, manual configuration or bilateral exchange of connectivity information between egress routers and OSPF boundary routers.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method of operating a router in a communication network comprising a plurality of routers, the router having a plurality of local non-broadcast multiple access interfaces to at least one connection-oriented non-broadcast multiple access network, the method comprising the steps of:
    assigning a number to each of the local non-broadcast multiple access interfaces of the router wherein each of the assigned numbers is local to the router;
    grouping the local non-broadcast multiple access interfaces of the router into connectivity classes using local connectivity information;
    encoding information identifying the assigned numbers and the connectivity classes into a link state packet; and
    transmitting the link state packet to at least one other router in the communication network.

2. The method of claim 1 wherein the link state packet is an OSPF link state advertisement.

3. The method of claim 1 wherein the information identifying the assigned numbers and the connectivity classes is encoded into opaque fields of the link state packet.

4. The method of claim 1 wherein the at least one connection-oriented non-broadcast multiple access network is an ATM network.

* * * * *